United States Patent [19]

Troyk et al.

[11] Patent Number: 5,179,511
[45] Date of Patent: Jan. 12, 1993

[54] SELF-REGULATING CLASS E RESONANT POWER CONVERTER MAINTAINING OPERATION IN A MINIMAL LOSS REGION

[75] Inventors: Philip R. Troyk, Morton Grove; Martin A. K. Schwan, Chicago, both of Ill.

[73] Assignee: Illinois Institute of Technology, Chicago, Ill.

[21] Appl. No.: 777,710

[22] Filed: Oct. 16, 1991

[51] Int. Cl.⁵ ............................................ H02M 7/537
[52] U.S. Cl. .................................... 363/97; 323/222; 363/131
[58] Field of Search .................... 323/222; 363/16, 19, 363/21, 97, 131

[56] References Cited

U.S. PATENT DOCUMENTS

| | | | |
|---|---|---|---|
| 3,919,656 | 11/1975 | Sokal et al. | 330/51 |
| 4,535,399 | 8/1985 | Szepesi | 363/97 |
| 4,607,323 | 8/1986 | Sokal et al. | 363/97 |
| 4,891,746 | 1/1990 | Bowman et al. | 363/131 |

FOREIGN PATENT DOCUMENTS

| | | | |
|---|---|---|---|
| 88671 | 7/1981 | Japan | 363/16 |
| 118069 | 6/1985 | Japan | 323/222 |
| 209476 | 8/1988 | Japan . | |

Primary Examiner—William H. Beha, Jr.
Attorney, Agent, or Firm—Speckman & Pauley

[57] ABSTRACT

A self-regulating Class E/resonant power converter includes a power switching device which is gated on at each transition between negative and positive half cycles of the load current by drive signals generated by a drive circuit, the rate at which the drive signals are generated being controlled by a zero crossing detector which monitors the load current and adjusts the frequency of the drive signals in correspondence with changes in the time between successive negative-to-positive zero crossings of the load current such that the power switching device continues to be switched on at substantially zero voltge, zero slope conditions to maintain the power converter operating at the optimal Class E frequency.

21 Claims, 3 Drawing Sheets

SELF-REGULATING CLASS E RESONANT POWER CONVERTER MAINTAINING OPERATION IN A MINIMAL LOSS REGION

BACKGROUND OF THE INVENTION

The present invention relates to power converters, and more particularly to closed-loop regulation of resonant power converters for maintaining operation in a minimal loss region.

Class E resonant power converters offer high efficiency and consequently, in operation, Class E resonant power converters are characterized by low power dissipation, low junction temperature and high reliability. Also, Class E resonant power converters are characterized by low sensitivity to component tolerances, enhancing manufacturing reproducibility and lessening manufacturing tolerances.

However, despite its extremely high efficiency, the Class E-type power converter has not gained wide acceptance in power converter applications because of the difficulties in regulating and control of the power converter. The Class E power converter must be operated in the "lossless region". Otherwise, large amounts of power are dissipated in the transistor switching devices of the power converter, resulting in damage to these components. To maintain operation in the "lossless region", it is necessary to maintain substantially zero voltage and zero slope conditions at the switch-on times for the power switching device. These conditions are disclosed in U.S. Pat. No. 3,919,656 of Sokal et al., for example. In known Class E converters, operation in the "lossless region" is established by selection of values for elements of the load and the load matching network. That is, the power converter includes a tuned network which establishes the operating frequency for the circuit. Consequently, variations in the load will result in a change in operating frequency, shifting the power converter operating point out of the "lossless region". Adjustment of duty cycle and the use of special switching devices in the Class E converters have been proposed, but have not provided entirely satisfactory results.

Another consideration is that in conventional Class E converters, regenerative feedback, or an independent drive oscillator, is used to drive the switching transistors. This renders the Class E circuit extremely sensitive to frequency variation because the "lossless region" of operation can only be maintained at one specific frequency for a specific load network. For even minor deviations from the Class E frequency, the switching losses become excessive and device destruction is likely. Maintaining Class E operation under conditions of changing inductance, or inductance and resistance, is essential to optimal circuit performance.

SUMMARY OF THE INVENTION

It is an object of the invention to provide an improved resonant power converter.

Another object of the invention is to provide a self-regulating resonant power converter.

A further object of the invention is to provide a self-regulating resonant power converter which tracks load changes and adjusts the turn-on time for the power switching device of the converter to maintain minimum power loss at the turn-on of the power switching device of the converter.

These and other objects are achieved by the following invention which provides a resonant power converter including controllable switching means having non-conducting and conducting states, and drive means providing drive signals for causing the switching means to switch between its non-conducting and conducting states to supply direct current power to a load through a resonant load network. In accordance with the invention, the power converter includes sensing means for sensing load current and control means responsive to the sensing means for controlling the drive means to adjust the switching time for the switching means in correspondence with changes in a parameter of the load current to cause the switching means to switch between its non-conducting and conducting states only when the amplitude of the voltage across the switching means is minimal and the slope of the voltage waveform for the voltage is substantially zero to thereby maintain the power converter operating in a minimal loss region.

Further in accordance with the invention, the control means includes zero crossing detecting means which is responsive to the sensing means for detecting zero-crossings of the load current and producing control signals corresponding to zero crossings of the load current. The drive means is responsive to the control signals to cause the switching means to switch between its non-conducting and conducting states and zero crossings of the load current.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF A PREFERRED EMBODIMENT

Figure 1:
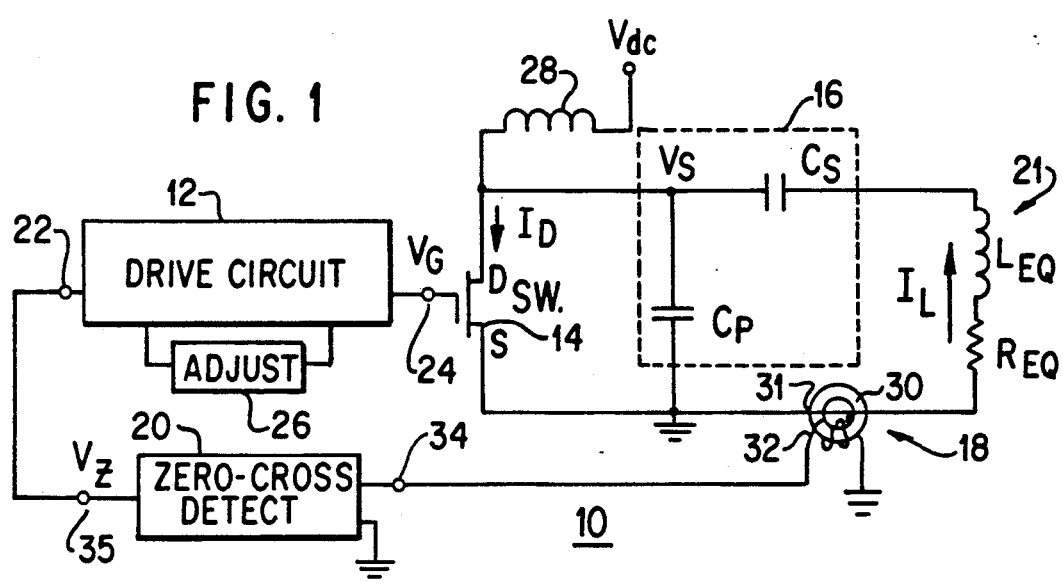
FIG. 1 is a simplified schematic and partial block diagram of a resonant power converter provided by the present invention.

Referring to FIG. 1, the resonant power converter 10 provided by the present invention includes a drive circuit 12, a controllable power switching device 14, a load network 16, a current sensor 18 and a zero crossing detector 20. The power converter 10 supplies direct current power to a load 21 through the load network 16.

The drive circuit 12 operates as an astable multivibrator having a control and synchronization input 22 and an output 24. The drive circuit 12 provides pulses, illustrated in FIG. 2, line A at its output 24 which cause the switching device 14 to switch between conductive and non-conductive states. An adjustment network 26 enables adjustment of the duty cycle for the drive circuit 12.

The controllable switching power device 14 is embodied as a field-effect transistor. The power converter 10 includes only one power switching device and that device is gated on at each transition between negative and positive transitions of the load current. The field-effect transistor has its gate electrode connected to the output 24 of the drive circuit 12 and its source electrode S connected to circuit ground. The drain electrode D of the field effect transistor 14 is connected through a high reactance inductance 28 to a DC voltage supply Vdc. The field-effect transistor has non-conducting and conducting states and is controlled by drive signals applied to its gate electrode to switch between its non-conducting and conducting states to supply direct current from the voltage source Vdc to the load 21 through the load network 16 in the manner of conventional resonant power converters.

Figure 3:
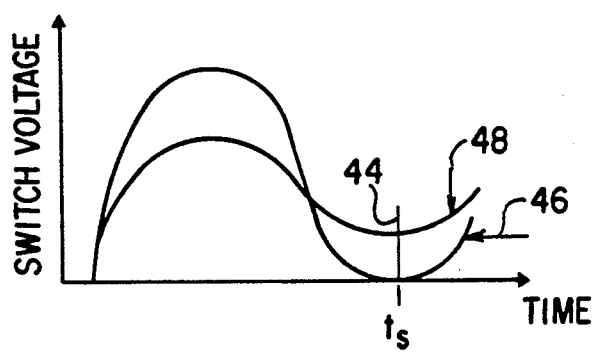
FIG. 3 illustrates switch voltage waveform trajectories for overdamped and critically damped conditions.

In accordance with the present invention, the load current $I_L$ is sensed and a control signal derived from the load current is used to determine the phasing of the switching of the field effect transistor between its non-conducting and conducting states. The control signal is produced at such a time as to cause the field-effect transistor to switch between its non-conducting and conducting states only when the amplitude of the switching voltage $V_s$ across the field-effect transistor is minimal and the slope of the waveform for the switching voltage $V_S$ is substantially zero. Under these conditions, the resonant power converter is maintained operating in the minimal loss region. Referring to FIG. 3, which is a graph of switching voltage $V_s$ as a function of time, the point of switch closure, i.e., the time at which the field-effect transistor 14 is switched on, that results in a minimum switching loss occurs at time $t_S$, indicated by the vertical line 44. For an overdamped switch condition, indicated at 48, the switching voltage is minimal, but has a finite value. For the critically damped condition, indicated at 46, the switching voltage is substantially zero. The closed loop control provided by the present invention maintains the resonant power converter operating in a minimal loss region, which in the case of a Class E/resonant power converter results in substantially zero voltage and substantially zero slope conditions at the switch-on times for the power switching device.

Figure 2:
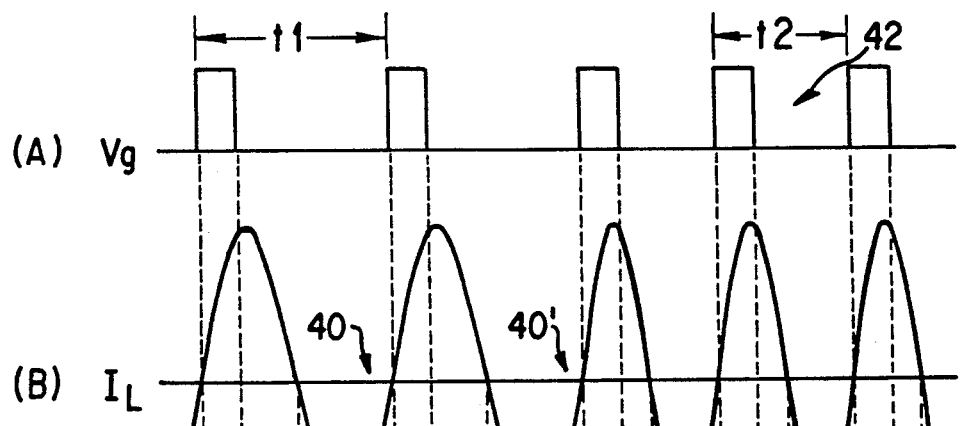
FIG. 2 is a timing diagram illustrating waveforms of various signals produced by the Class E/resonant power converter illustrated in FIG. 1.
Figure 2:
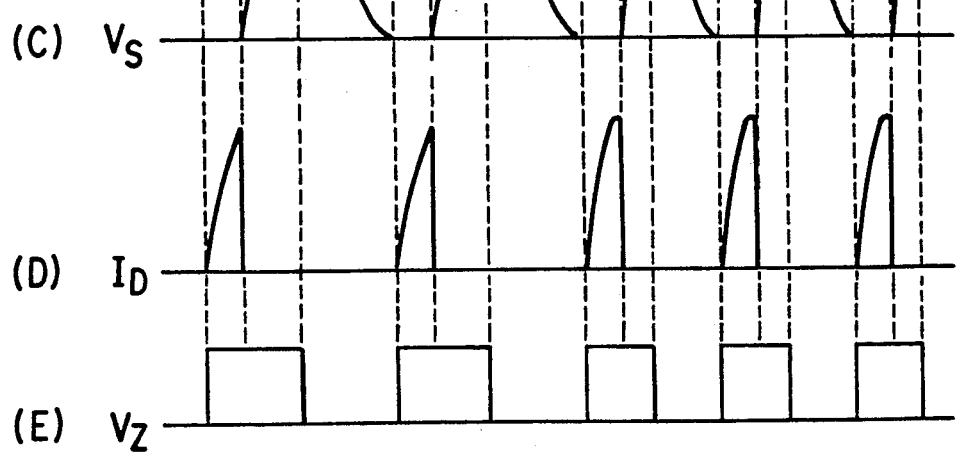

Referring to FIGS. 1 and 2, the load network 16 comprises a parallel capacitance $C_p$ which is connected in parallel with the field-effect transistor 14 and a series capacitance $C_S$ which is connected in series between the drain of the field-effect transistor 14 and the load.

The load 21 is illustrated as comprising an inductance component $L_{EQ}$ which represents the equivalent input inductance of the load, which is typically a transformer, and a resistance $R_{EQ}$ which represents the equivalent load resistance, i.e., the reflected load resistance.

The current sensor 18 is connected in series with the load 21 to sense load current $I_L$. The current sensor 18 comprises a step-down transformer including a ferrite core 30 having its primary winding 31 connected in series between the load and a circuit ground and a secondary winding 32 connected between the input 34 of the zero crossing detector 20 and circuit ground. The transformer primary winding has a single turn and the transformer secondary winding has N turns so that the amplitude of the signal applied to the zero crossing detector is $I_L/N$. The output 35 of the zero crossing detector 20 is connected to the control and synchronization input 22 of the drive circuit 12. The signal output $V_Z$ of the zero crossing detector 20 becomes a logic high level, FIG. 2, line E, with each negative-to-positive transition of the load current $I_L$, and becomes a logic low level with each positive-to-negative transition of the load current $I_L$, FIG. 2, line B. The drive circuit 12 responds to the positive or leading edge of the signals produced by the zero crossing detector 20 to gate "on" the field effect transistor 14.

Figure 4:
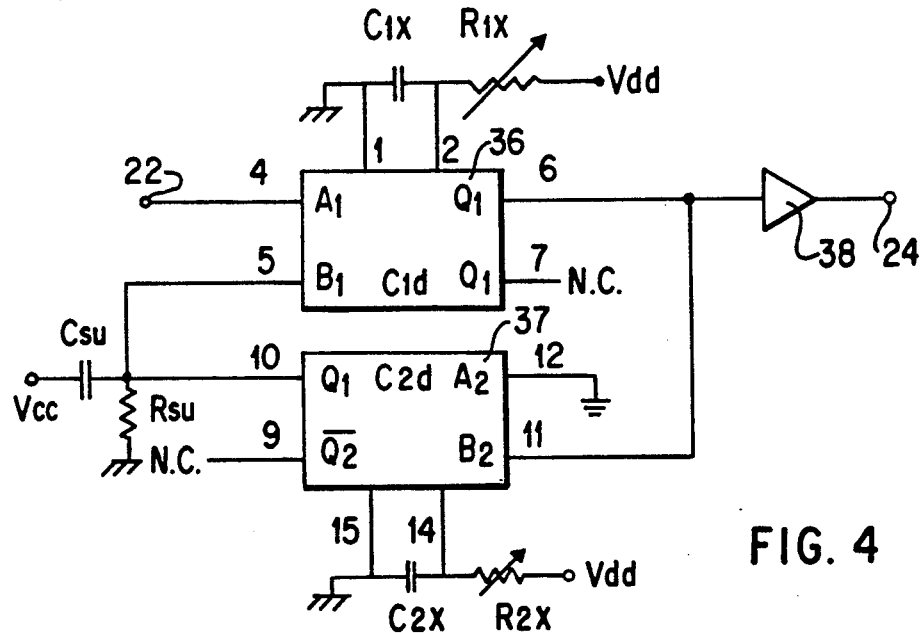
FIG. 4 is a schematic circuit diagram of a drive circuit of the resonant power converter illustrated in FIG. 1.

Referring to FIG. 4, the drive circuit 12 includes two monostable multivibrator circuits 36 and 37, which may be the commercially available type 74HC4538 dual monostable multivibrator, and a power driver circuit 38, such as one section of a commercially available type TXC427 dual power mosfet driver. Circuit 36 has an input A1 connected to the input 22 of the drive circuit 12, which is connected to the output of the zero crossing detector 20 (FIG. 1). Circuit 36 has an output Q1 connected to the input of the power driver circuit 38, which has its output connected to the output 24 of the drive circuit 12 which is connected to the gate of the field-effect transistor 14. Circuit 36 has a second input B1 connected to the junction of a capacitor Csu and a resistor Rsu which are connected in series between supply Vdc and ground. Circuit 37 has an input B2 connected to the output Q1 of circuit 36 and an output Q2 connected to the junction of capacitor Csu and resistor Rsu. Capacitor Csu and resistor Rsu initiate oscillation of the drive circuit when power is initially applied.

Capacitors C1x and C2x and resistors R1x and R2x are external timing components. Capacitor C1x and resistor R1x, which are associated with circuit 36, control the pulse width of the drive signal. Adjusting resistor R1x adjusts the width of the drive signal. Capacitor C2x and resistor R2x, which are associated with circuit 37, determine the start up frequency of the drive circuit.

When power is applied to the resonant power converter 10, the multivibrator circuits 36 and 37 which comprise the drive circuit 12 initially produce drive pulses $V_g$ for the field effect device 14 under the control of resistor Rsu and capacitor Csu. Once oscillations begin, the basic oscillator circuit is overridden and the operating frequency is determined by the rate or frequency of the control signals generated by the load current zero crossing detector 20 and applied to the synchronization input 22 and thus input A1 of circuit 36 of the drive circuit 12.

When the field-effect transistor 14 is in its non-conducting state the voltage $V_s$, FIG. 2, line C, across the switching device 14 is relatively high. When the field effect transistor 14 is in its conducting state, current $I_D$, FIG. 2, line D, flows through the switching device 14 and the voltage $V_s$ is near zero, FIG. 2, line C.

In the exemplary embodiment, the resonant power converter 10 is operated as a Class E/resonant power converter and the closed loop control maintains the converter operating in the "lossless region". Operation of the Class E power converter in the "lossless region"

is essential to optimal circuit performance for Class E operation. To maintain operation in the "lossless region", it is necessary to maintain substantially zero voltage and substantially zero slope conditions at the switch-on times for the power switching device, and to maintain a minimum circuit Q which is sufficiently high to produce oscillation.

The field effect transistor 14 is gated on in response to each drive pulse $V_g$, FIG. 2, line A, generated by the drive circuit 12. When the field effect device 14 is gated on, load current $I_L$ flows as illustrated in FIG. 2, line B.

The signal output of the current sensor 18 is applied to the input 34 of zero crossing detector 20 which produces control signals $V_Z$, FIG. 2, line E, for drive circuit 12. The drive circuit 12 responsively provides gate signals for the power switching device 14 of the resonant power converter. The field-effect transistor is gated on at each transition between negative and positive half cycles of the load current $I_L$, as can be seen by comparing the signals illustrated in lines A and B of FIG. 2. At such time, the voltage $V_s$ across the switching device is zero.

Maintaining Class E operation under conditions of changing inductance, or changing inductance and resistance, is essential to optimal circuit performance. The power converter according to the present invention uses the current flowing through the load to determine the phasing of the switching of the field-effect transistor 14. To maintain Class E operation, the switching must occur at zero-slope of the voltage across the switching device. To insure this condition, a minimum circuit Q must be maintained. This is accomplished by the closed loop arrangement which regulates at the frequency of which circuit Q is sufficiently high to produce oscillation. In operation, whenever the load inductance, or load resistance and inductance varies, the operating frequency of the power converter tends to change. This results in an increase or decrease in time between successive zero crossings of the load current as indicated at 40 and 40' in FIG. 2, line B. The self-regulating arrangement of the power converter 10 senses this change in the frequency of the load current and adjusts the frequency of the gating pulses $V_g$, shortening the period from $t_1$ to $t_2$ for the gating pulses $V_g$ as indicated at 42 in FIG. 2, line A. Consequently, there is a corresponding change in the switching time for the power switching device 14. Therefore, the power switching device 14 continues to be switched on only at zero voltage/zero slope conditions as can be seen by comparing the signal waveforms in FIG. 2, lines A and C.

By its nature, the Class E power converter does not operate at resonance, and the precise frequency at which Class E operation occurs is difficult to predict and to functionally maintain. The Class E topology should operate between a series and parallel resonant peak. The load current is approximately 90° out of phase with the load voltage. The current sensor 18 does not maintain the power converter operating at resonance, but rather at the optimal Class E frequency. That is, the load current zero crossings are used to provide frequency stability for a specific converter topology, the Class E, which formerly has been difficult to control.

Figure 5:
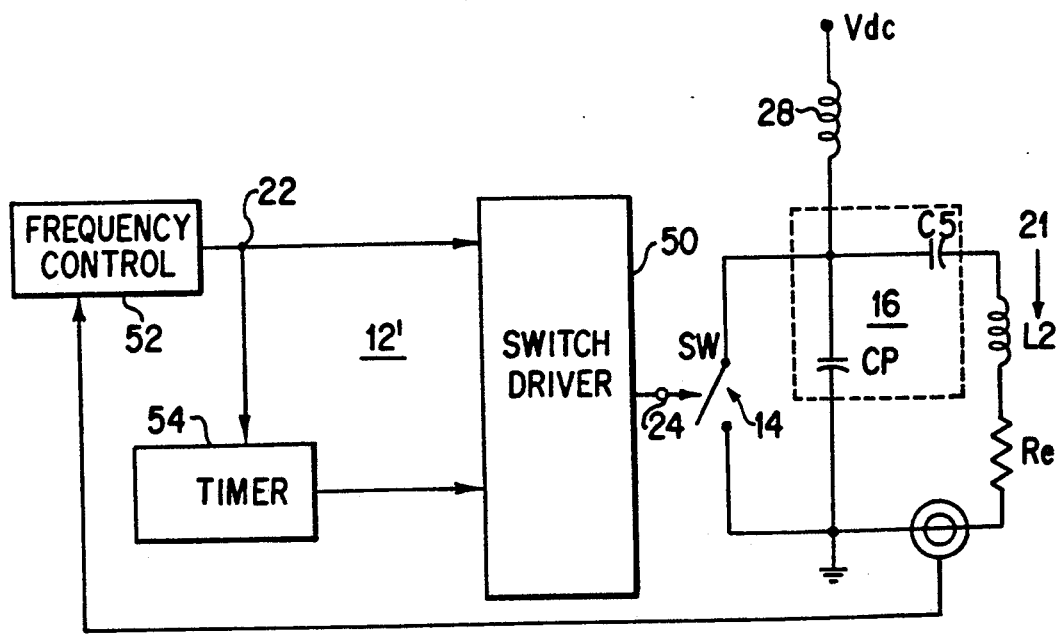
FIG. 5 is a schematic and partial block diagram of a further embodiment of a resonant power converter provided by the present invention.

Referring to FIG. 5, there is illustrated a block diagram of a second embodiment for a resonant power converter 10' provided by the present invention. The power converter 10' is similar to the resonant power converter 10. The power converter 10' includes a drive circuit 12', a switching device 14, a load network 16, and a current sensor 18. The power converter 10' supplies direct current power to a load 21 through the load network 16. The drive circuit 12' includes a switch driver 50, a frequency control circuit 52 and a timer circuit 54. In this embodiment, the output winding 32 of the transformer 30 which comprises the load current sensor 18 is not grounded so that the load current is sensed as the difference between the supply voltage and the equivalent load resistance. This sensing arrangement could be employed in the embodiment of the resonant power converter 10 shown in FIG. 1 with suitable modification in the zero crossing detector 20. In such arrangement, the secondary winding of the current sensor transformer would not be connected to ground and load current would be sensed as the difference between supply voltage and equivalent load resistance.

The drive circuit 12' operates in a manner similar to the zero crossing detector circuit 20 and the drive circuit 12 for the embodiment of the power converter 10 in that the frequency control circuit 52 detects zero crossings of the load current and enables the switch driver 50 to switch the switching device 14, which is embodied as a field-effect transistor (FIG. 6), to its closed state. The frequency control circuit 52 enables the timer circuit 54 which causes the switch driver 50 to terminate the drive pulse at the end of a predetermined time interval. The frequency control circuit 52 responds to the sensed load current signal provided by the current sensor 18 to adjust the frequency of the drive signals produced by the switch driver 50 in correspondence with the changes in the time between successive negative-to-positive zero crossings of the load current such that the power switching device continues to be switched on at minimal voltage, and zero slope conditions to maintain the power converter operating at the minimal loss condition. For Class E operation, the switching voltage is substantially zero and the closed loop control maintains the Class E/resonant power converter operating in the "lossless region".

Figure 6:
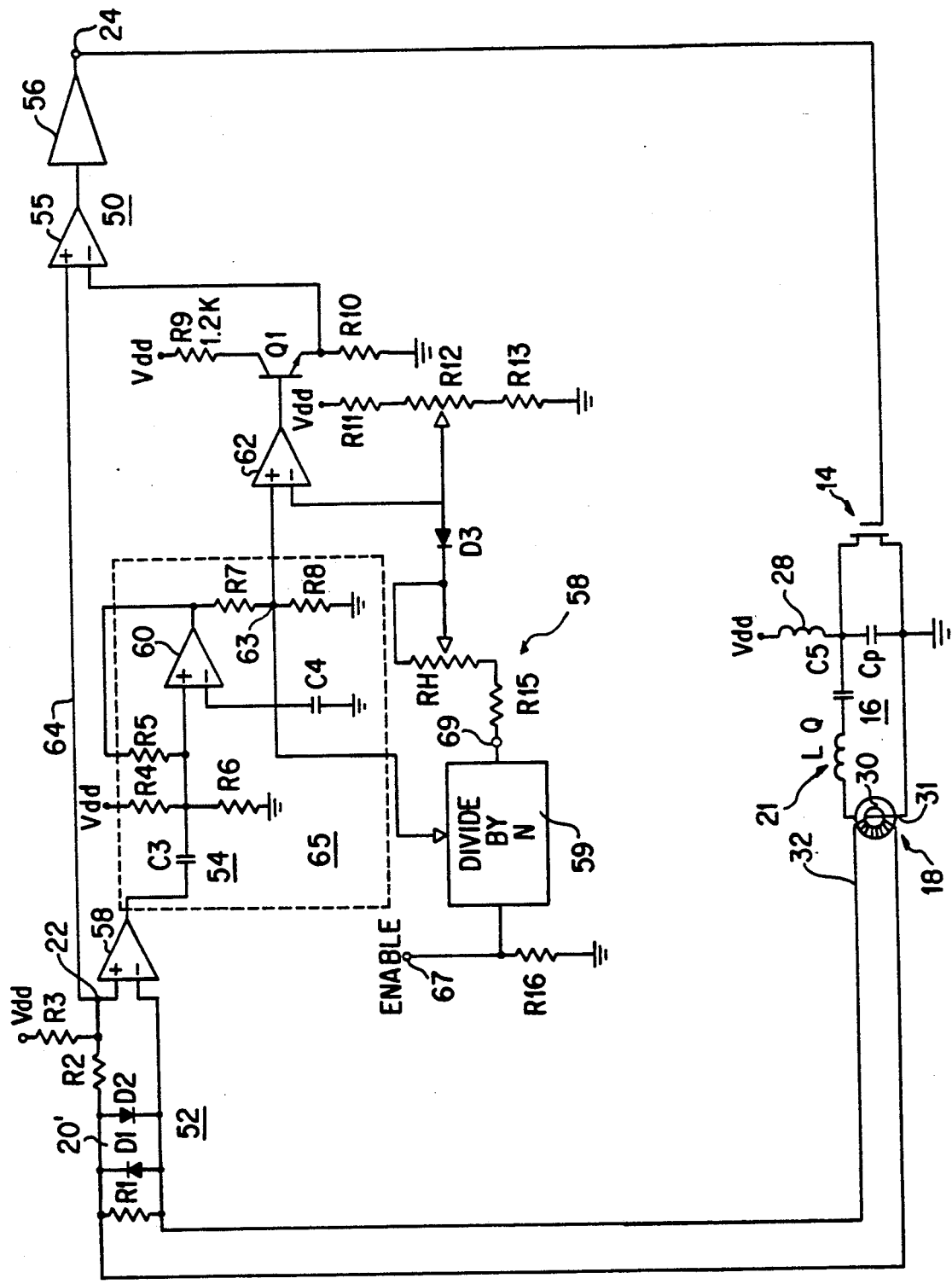
FIG. 6 is a schematic circuit diagram of the resonant power converter illustrated in FIG. 5.

Referring to FIG. 6, there is illustrated a schematic circuit diagram for the drive circuit 12'. The frequency control circuit 52 includes a resistor R1 and reverse connected diodes D1 and D2 which are connected across the output winding 32 of the current sensor 18, and between the non-inverting and inverting inputs of the comparator circuit 58. Resistors R2 and R3 supply a positive bias voltage to the positive input of the comparator circuit 58. Diodes D1 and D2 function as a zero crossing detector circuit 20'.

The timer circuit 54 includes a comparator circuit 60, a comparator circuit 62 and a transistor Q1, and associated capacitors C3-C4 and resistors R4-R13. Resistors R7 and R8 and capacitors C3, C4 and comparator circuit 60 comprise a relaxation oscillator circuit 65, the frequency of which is set lower than the operating frequency of the Class E/resonant power converter 10' which, for one circuit which was constructed was 760 KHz. The input of the relaxation oscillator circuit 65 is connected to the output of comparator circuit 58. The output of the relaxation oscillator circuit at 63 is connected to the non-inverting input of comparator circuit 62. The relaxation oscillator circuit 65 produces a signal having an exponentially varying waveform which is applied to the non-inverting input of comparator circuit 62. The inverting input of comparator circuit 62 is connected to a voltage divider network including resistors R11–R13 which establishes the switching point for the comparator circuit 62. The output of comparator circuit 62 is connected to the base of transistor Q1. Transistor Q1 is connected for emitter follower operation. Transistor Q1 has its emitter connected to the inverting input of a comparator circuit 55 which together with buffer amplifier 56 comprise the switch driver 50. Comparator circuit 55 has its non-inverting input connected via conductor 64 to the non-inverting input of comparator circuit 58 at the output of the zero crossing detecting network 20'. The output of comparator circuit 55 is connected to the input of buffer amplifier 56, the output of which is connected to the output 24 of the drive circuit 12'.

For the purpose of applying a modulation component to the drive pulse used for driving the power switching device, there is provided a modulation enable network 58 including a divide-by-N circuit 59 having associated resistors R14–R16. The modulation enable network 58 is isolated from the comparator circuit 62 by reverse connected diode D3. A clock signal input of the divide-by-N network is connected to the output 63 of the relaxation oscillator circuit 65. The divide-by-N network has a enable input 67 for receiving a modulation enable signal which activates the divide-by-N network. The output 69 of the divide-by-N network is connected through resistors R15 and R14 to the cathode of diode D3 which has its anode connected to the inverting input of comparator circuit 62.

In one power converter that was constructed, the comparator circuits 55, 58, 60 and 62 were the commercially available type LT1016-CN8 Ultra Fast Precision Comparators, and the buffer amplifier 56 was the commercially available type LH0033C Fast Buffer Amplifier. The field effect transistor 14 was the type IRF531. The divide-by-N circuit 59 was a CD4024BE 7 stage binary counter with DIP switches to set N to 8, 16, or 32. The supply voltage Vdd was 5 volts derived from voltage Vcc, which was a 9 volt source.

At power-up, the current through inductance $L_{eq}$ is zero, and there is no feedback signal across the secondary winding 3 at the output of the transformer. Resistors R2 and R3 provide a bias voltage at the non-inverting inputs of comparator circuits 55 and 58 of approximately 4 mV in order to avoid chatter. The relaxation oscillator 65 produces an exponentially varying waveform at the non-inverting input of comparator circuit 62.

In the absence of a modulation enable signal, diode D3 is reverse biased and resistor R12 sets the switch point for comparator circuit 62. Thus, when the voltage on capacitor C4 falls below the voltage at the wiper of resistor R12, the voltage on the inverting input of comparator circuit 62 is less than the voltage on the non-inverting input, and the output of switch drive 50 is high, turning on the switching device 14. When the voltage on capacitor C4 rises above that of the voltage at the wiper of resistor R12, the switch turns off. In this open-loop mode, the relaxation oscillator controls both the frequency and the "on" time of the switch driver 50.

As the magnitude of the AC current flowing in the series branch of the load circuit 21 increases, the current from transformer T1 produces a square wave voltage signal across Rl, due to the clamping action of the diodes D1 and D2. This square wave signal is 180 degrees out of phase with the current in the load circuit 21. As this current crosses zero and the square wave signal goes positive, both comparator circuits switch to the high state, operating the power switching device to its "on" state. Because the natural frequency of the relaxation oscillator is lower than the Class E frequency, the leading edge of the output of comparator circuit 58 serves to synchronize the relaxation oscillator. Comparator circuit 62 becomes logic high, after a delay determined by comparator circuit 60, and the voltage t the inverting input of comparator circuit 55 is pulled high, resulting in the termination of the drive signal produced by switch drive 50, rendering the active device switch 14 non-conducting. Thus, comparator circuit 60 serves initially to start the converter, then functions as a pulse duration circuit. The direct signal path 6 from the output of network 20' to the input of comparator circuit 55 minimizes the delay between the current zero-crossing and the leading edge of the switch drive. The indirect signal path including comparator circuits 58, 60 and 62 determines the pulse duration.

When a modulation enable signal is applied to input 67 of the divide-by-N network 59, the network is enabled to respond to the signal produced by the relaxation oscillator and produce a logic low level output. When the output of the divide-by-N circuit 59 becomes logic low, resistors R14 and R15 shunt the reference voltage at the inverting input of comparator circuit 62. Consequently, the switch drive pulse duration is decreased. The time of occurrence of the logic low output of the divide-by-N network 59 is determined by the setting of the DIP switches of the divide-by-N network and the frequency of the signal produced by relaxation oscillator 65.

We claim:

1. In a resonant power converter including controllable switching means having non-conducting and conducting states, drive means providing drive signals for causing said switching means to switch between its non-conducting and conducting states to supply direct current power to a load through a resonant load network, the improvement comprising: sensing means for sensing load current; and control means responsive to said sensing means for controlling said drive means to adjust the switching time for said switching means in correspondence with changes in a parameter of the load current to cause said switching means to switch between its non-conducting and conducting states only when the amplitude of the voltage across said switching means is minimal and the slope of the voltage waveform for said voltage is substantially zero to thereby maintain the resonant power converter operating in a minimal loss region.

2. The power converter according to claim 1, wherein the operating frequency for the power converter is determined by said control means and varies in correspondence with changes in the load.

3. The power converter according to claim 1, wherein said control means causes said switching means to switch from its non-conducting state to its conducting state in synchronism with zero crossings of the load current.

4. The power converter according to claim 3, wherein said control means responds to negative-to-positive transitions of the load current to cause said switching device to switch from its non-conducting state t its conducting state.

5. The power converter according to claim 3, wherein said control means comprises zero crossing detecting means and said sensing means comprises a current transformer having a primary winding connected in circuit with the load and a secondary winding coupled to the input of said zero crossing detecting means.

6. In a resonant power converter including controllable switching means having non-conducting and conducting states, drive means providing drive signals for causing said switching means to switch between its non-conducting and conducting states to supply direct current power to a load through a resonant load network, the improvement comprising: sensing means for sensing load current; zero crossing detecting means responsive to said sensing means for detecting zero-crossings of the load current and producing control signals corresponding to zero crossings of the load current; said drive means being responsive to said control signals to cause said switching means to switch between its non-conducting and conducting states at zero crossings of the load current whereby the amplitude of the voltage across said switching means is minimal and the slope of the voltage waveform for said voltage is substantially zero when said switching means is switched from its non-conducting state to its conducting state.

7. The power converter according to claim 6, wherein one of said control signals is produced by said zero crossing detecting means for each cycle of the load current, and said control signals are applied directly to said drive means on a cycle-to-cycle basis to establish an operating frequency for said power converter which corresponds to the frequency of the load current.

8. In a Class E/resonant power converter including controllable switching means having non-conducting and conducting states, drive means providing drive signals for causing said switching means to switch between its nonconducting and conducting states to supply direct current power to a load through a resonant load network, the improvement comprising: sensing means for sensing load current; and control means responsive to said sensing means for controlling said drive means to adjust the switching time for said switching means in correspondence with changes in a parameter of the load current to cause said switching means to switch between its non-conducting and conducting states only when the amplitude of the voltage across said switching means is substantially zero and the slope of the voltage waveform for said voltage is substantially zero.

9. The power converter according to claim 8, wherein the operating frequency for the power converter is determined by said control means and varies in correspondence with changes in the load.

10. The power converter according to claim 8, wherein said control means causes said switching means to switch from its non-conducting state to its conducting state in synchronism with zero crossings of the load current.

11. The power converter according to claim 10, wherein said control means responds to negative-to-positive transitions of the load current to cause said switching device to switch from its non-conducting state to its conducting state.

12. The power converter according to claim 11, wherein the load voltage is approximately 90° out of phase with the load current.

13. The power converter according to claim 10, wherein said control means comprises zero crossing detecting means and said sensing means comprises a current transformer having a primary winding connected in circuit with the load and a secondary winding coupled to the input of said zero crossing detecting means.

14. The power converter according to claim 8, wherein said switching means comprises a single solid state switching device.

15. In a class E/resonant power converter including controllable switching means having non-conducting and conducting states, drive means providing drive signals for causing said switching means to switch between its nonconducting and conducting states to supply direct current power to a load through a resonant load network, the improvement comprising: sensing means for sensing load current; zero crossing detecting means responsive to said sensing means for detecting zero-crossings of the load current and producing control signals corresponding to zero crossings of the load current; said drive means being responsive to said control signals to cause said switching means to switch between its non-conducting and conducting states at zero crossings of the load current whereby the amplitude of the voltage across said switching means is substantially zero and the slope of the voltage waveform for said voltage is substantially zero when said switching means is switched from its non-conducting state to its conducting state.

16. The power converter according to claim 15, wherein said control means responds to negative-to-positive transitions of the load current to cause said switching device to switch from its non-conducting state to its conducting state.

17. The power converter according to claim 15, wherein the operating frequency for the power converter is determined by said control means and varies in correspondence with changes in the load.

18. The power converter according to claim 15, wherein the load voltage is approximately 90° out of phase with the load current.

19. The power converter according to claim 15, wherein one of said control signals is produced by said zero crossing detecting means for each cycle of the load current, and said control signals are applied directly to said drive means on a cycle-to-cycle basis to establish an operating frequency for said power converter which corresponds to the frequency of the load current.

20. The power converter according to claim 15, wherein said sensing means comprises a current transformer having a primary winding connected in circuit with the load and a secondary winding coupled to the input of said zero crossing detecting means.

21. The power converter according to claim 15, wherein said switching means comprises a single solid state switching device.

* * * * *

UNITED STATES PATENT AND TRADEMARK OFFICE
CERTIFICATE OF CORRECTION

PATENT NO. : 5,179,511
DATED : January 12, 1993
INVENTOR(S) : Philip R. Troyk, et. al.

It is certified that error appears in the above-indentified patent and that said Letters Patent is hereby corrected as shown below:

Column 1, after the title insert --This invention was made with Governmnt support under Contract NO. N01-NS-9-2327, awarded by the National Institute of Health. The Government has certain rights in this invention.--

Signed and Sealed this

Twenty-sixth Day of April, 1994

Attest:

BRUCE LEHMAN

*Attesting Officer*    *Commissioner of Patents and Trademarks*